United States Patent

Dotson et al.

[15] 3,637,418
[45] Jan. 25, 1972

[54] POLYOLEFIN ARTICLES HAVING EFFECTIVE OXYGEN BARRIERS

[72] Inventors: Billy R. Dotson; Robert F. Williams, Jr., both of Rochester, N.Y.

[73] Assignee: Eastman Kodak Company, Rochester, N.Y.

[22] Filed: Oct. 13, 1969

[21] Appl. No.: 866,015

[52] U.S. Cl. ..............................117/76 F, 117/72, 117/73, 117/81, 117/83, 117/94, 117/95, 117/138.8 E
[51] Int. Cl. ................B44d 1/14, B32h 27/08, B32h 27/32
[58] Field of Search ...................117/138.8 E, 76 F, 72, 81, 117/83

[56] References Cited

UNITED STATES PATENTS

| | | | |
|---|---|---|---|
| 2,779,684 | 1/1957 | Alles | 117/76 F X |
| 2,985,542 | 5/1961 | Pinsky et al. | 117/138.8 E |
| 3,018,195 | 1/1962 | Kelly et al. | 117/138.8 E |
| 3,091,536 | 5/1963 | Rusignuolo et al. | 117/138.8 E |
| 3,216,885 | 11/1965 | Schaufelberger | 117/138.8 E X |
| 3,294,577 | 12/1966 | Mayer | 117/138.8 E |
| 3,399,071 | 8/1968 | Schaufelberger et al. | 117/138.8 E X |
| 3,421,927 | 1/1969 | Donaldson et al. | 117/76 F |
| 3,459,582 | 8/1969 | Swerlick | 117/76 F X |

*Primary Examiner*—William D. Martin
*Assistant Examiner*—Ralph Husack
*Attorney*—Walter O. Hodsdon and John T. Lewis

[57] ABSTRACT

Laminated polyolefin articles can be manufactured by applying two overcoat layers.

1. The first overcoat layer, in contact with the polyolefin, is of a film-forming materials selected from the group consisting of maleated polyethylene and vinyl ether/maleic anhydride copolymers.
2. The second layer, applied over the first overcoat layer is of a material selected from the group consisting of poly (vinyl alcohols), poly (vinylidene chlorides) and chemically Hardened gelatin.

The resulting articles have very low permeability to gases such as oxygen.

9 Claims, No Drawings

POLYOLEFIN ARTICLES HAVING EFFECTIVE OXYGEN BARRIERS

This invention relates to polyolefin containers and overwraps having coatings that render the resulting laminated articles extremely resistant to the passage therethrough of oxygen gas (air).

One of the shortcomings of conventional containers and wrapping materials made of polyethylene or polypropylene is their relatively high natural permeability to gases such as oxygen. This shortcoming limits the use of polyolefin articles as containers for materials (such as photographic developer solutions) that are reactive with oxygen, because such reactive solutions have a very short "shelf life" when they are stored in containers having such a high degree of oxygen (air) permeability. For example, it has been found that a conventional polyethylene bottle (having sidewalls approximately 40 mils thick) permits more than $1 \times 10^{-5}$ moles of oxygen per 100 square centimeters of surface area (at room temperature) to pass through its walls in about 300 hours. This should be compared with the need for a container that permits less than $5 \times 10^{-}$ moles of oxygen (per 100 cm.$^2$), if the container is to be considered acceptable for use in the storage of materials that are fairly sensitive to oxidation by air (such as some of the well-known photographic developer solutions).

To date several suggestions have been made to help solve this problem. For example, it has been suggested heretofore that the use of a gelatin coating could accomplish the necessary resistance to the passage of oxygen through the resulting coated article. Unfortunately, gelatin coatings are prone to accidental removal (by, for example, excessive flexing of the container or by subjecting the container to shock as by scuffing, dropping or bumping it). Other means for improving the "oxygen barrier" properties of polyolefin containers that have been suggested include chemical, ionizing or flame treatments of the surfaces of the containers (to make them more receptive to effective gas resistant overcoats). However, such methods are limited to usage with surfaces that are fairly small and nonintricate.

It is an object of this invention to provide overcoated polyolefin containers that (a) resist the permeation of gases such as oxygen to an extent sufficient to make the use of such containers practical for storing oxygen-sensitive photographic developer solutions, and (b) retain such excellent gas barrier properties after being subject to scuffing, flexing, bumping and other types of abuse encountered in normal use.

These objects can be achieved by utilizing a special double overcoat on the polyolefin article. The first layer of the double overcoat consists essentially of a member of the group consisting of certain maleated polyethylenes and poly(vinyl methyl ethers-maleic anhydride copolymers), while the second layer of the double overcoat consists essentially of a member of the polymer group consisting of certain film-forming poly(vinyl alcohols), film-forming poly(vinylidene chlorides) and the reaction products of gelatin and a gelatin hardener such as, for example, formaldehyde.

The maleated polyethylenes that are useful in the successful practice of this invention are those having an acid number of from about 5 to about 50. These materials are well known in the art and need not be described in great detail at this point, except that those maleated polyethylenes that are useful in the successful practice of this invention are also solid at temperatures up to about 50° C.

The copolymers of vinyl methyl ether and maleic anhydride that are useful in the successful practice of this invention are those products of the following reaction:

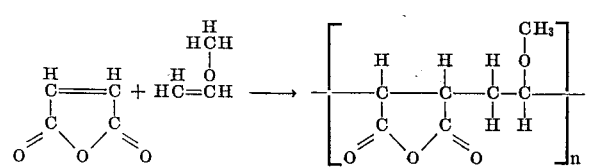

having specific viscosities (measured in the usual way by dissolving 1 part by weight of the copolymer in 99 parts by weight of dimethylformamide, and then measuring the viscosity of the resulting solution at 25° C., using an Ostwall viscometer, in accordance with "method B," ASTM procedure D-445-446T), between about 0.5 and about 4. The molecular weight of such copolymers is within the range of from about 1,000 to about 2 million. The useful materials are also solid at temperatures below about 50° C. Also, whether the "anhydride" portion of the copolymer is anhydrous or partially or even largely, hydrolyzed is not critical with respect to this invention, although the use of essentially "anhydrous" copolymer is preferred.

Any poly(vinyl alcohol) or poly(vinylidene chloride) polymeric film-forming material that is solid at temperatures below about 50° C. can be used successfully as the second overcoat layer of this invention. Also, mixtures of these polymeric materials can be used.

Any chemically hardened gelatins that can be used in the successful practice of this invention so long as the gelatin fraction represents at least about 50 weight percent (preferably at least about 60 weight percent) of the "hardened gelatin" composition. It is well known that gelatin can be chemically hardened by many materials such as, for example, formaldehyde, hydroxyalkyl substituted biuret compounds, mono-alkylol and dialkylol substituted dicyandiamide, monoalkylol and dialkylol substituted formamidine hydrochloride, sucrose, sorbitol, glucose, 3,3,5,5-tetrahydroxymethyl tetrahydropyran-4-ol, 3,3,5,5-tetrahydroxymethyl tetrahydrogamma-pyrone, quinic acid, hexoses, monoamino derivatives of hexoses and their salts, melamine formaldehyde resins, ethylene diamine tetra-acetic acid (disodium salt), and the like. It is also preferred, although not essential, that the final stages of the "hardening" reaction occur after the gelatin-hardener coating has been applied, in the practice of the present invention.

The respective overcoats of this invention can best be applied from aqueous or organic solvent solutions (depending upon in which type of solvent the overcoat material is soluble). Such solutions should preferably contain at least about 3 weight percent of the desired polymeric "overcoat" materials. For example, the useful maleated polyethylenes and vinyl methyl ether/maleic anhydride copolymers are readily soluble in xylene, while the materials of the "second overcoat" layer of this invention are generally soluble in water or water-ethanol mixtures. If desired, the overcoat materials can also be applied to the polyolefin articles in the form of an appropriate emulsion, the only limitation being that ultimately the coating that is formed consist essentially of the coating material(s) of this invention.

In the following Example, all "parts" given are by weight unless otherwise specified.

EXAMPLE

Blow molded print, square polyethylene bottles having walls approximately 40 mils thick are coated with films of various materials from solvents in which the materials are soluble. In each case (except the uncoated "control") two coats are applied. The first coat is applied by dipping the bottles into a 5 weight percent solution of maleated polyethylene (sold under the trade name "maleated Epolene C-10") having an acid number of 10.6, in xylene. The bottles are then drip dried at room temperature and then heated for 10 minutes at 110° C. Then the second overcoat is applied.

The oxygen permeability of each bottle is then determined over a period of 310 hours by using the method of Speos and Calvano, as presented in their publication, "A Practical Gas Permeation Test for Plastic Containers," 22nd Annual Technical Conference of the Society of Plastic Engineers, March 1966, P. IX-3. In table I, below, is summarized the results of several of the tests:

TABLE I

OXYGEN PERMEABILITY TEST DATA

| Overcoat | Moles $O_2$ per 100 sq. cm. ($\times 10^{-5}$)—310 hours |
| --- | --- |
| None | 11.3 |
| Gelatin | 11.3 |
| Gelatin/formaldehyde[1] | 3.7 |
| Polyvinyl alcohol | 3.0 |
| Poly(vinylidene chloride)[2] | 3.0 |
| Chlorinated polyethylene | 11.3 |
| Cellulose butyrate phthalate[3] | 11.3 |

[1] 7.5% pigskin gelatin +3.5% formaldehyde in water.

[2] 5% solids (sold under the trade name "Daran 210 Latex") in water.

[3] 5.4% solids, ammonium salt, in water.

Similar results are obtained when the first coating layer is one of the vinyl methyl ether/maleic anhydride copolymers described hereinbefore.

The polyolefin articles of this invention are all of those articles made of polyethylene or polypropylene that are permeable to oxygen, that are useful for storing or wrapping oxygen-sensitive materials, and which have at least one thin wall or surface that is at most about 50 mils thick. This includes most blow-molded cast or extruded polyolefin containers and films.

Generally, for at least a substantial decreasing effect on the gas permeability of the polyolefin articles of this invention, the polymeric material in the first overcoat layer (that layer adjacent the polyolefin surface) should be fairly uniformly distributed over the polyolefin surface in a film which is at least about 0.5 mil thick and in an amount equal to at least about 0.2 pound per 1,000 square feet of treated surface. Similarly the material in the second overcoat layer of this invention should have a layer thickness of at least about 0.5 mil.

The invention has been described in detail with particular reference to preferred embodiments thereof, but it will be understood that variations and modifications can be effected within the spirit and scope of the invention.

What is claimed is:

1. A polyolefin article having substantially decreased permeability to oxygen gas, said article having coated on at least one of its surfaces a barrier overcoat; said barrier overcoat containing
   a. first layer consisting essentially of a polymeric film forming material selected from the group consisting of maleated polyethylenes having acid numbers of from about 5 to about 50, vinyl methyl ether/maleic anhydride copolymers and mixtures thereof; said first layer being attached directly to the polyolefin surface of said article; and
   b. a second layer consisting essentially of a film-forming material selected from the group consisting of poly(vinyl alcohols), poly(vinylidene chlorides), chemically hardened gelatin, and mixtures thereof; said second layer being coated over said first layer, and each layer being at least about 0.5 mil thick.

2. A polyolefin article as in claim 1, wherein said polyolefin is polyethylene and said article has at least one thin wall that is at most about 50 mils thick.

3. A polyethylene article as in claim 2, wherein said first layer consists essentially of said maleated polyethylene and said second layer consists essentially of said chemically hardened gelatin.

4. A polyethylene article as in claim 3, wherein said chemically hardened gelatin is the reaction product of gelatin and formaldehyde.

5. A polyethylene article as in claim 2, wherein said first layer consists essentially of said maleated polyethylene and said second layer consists essentially of a film-forming polyvinyl alcohol.

6. A polyethylene article as in claim 2, wherein said first layer consists essentially of said vinyl methyl ether/maleic anhydride copolymer and said second layer consists essentially of a film-forming polyvinyl alcohol.

7. A polyethylene article as in claim 2, wherein said first layer consists essentially of said maleated polyethylene and said second layer consists essentially of a film-forming poly(vinylidene chloride).

8. A polyethylene article as in claim 2, wherein said first layer consists essentially of said vinyl methyl ether/maleic anhydride copolymer, and said second layer consists essentially of chemically hardened gelatin.

9. A polyethylene article as in claim 8, wherein said hardened gelatin is the reaction product of gelatin and formaldehyde.

* * * * *